Nov. 18, 1941.  A. BOENECKE  2,262,881

METHOD OF PRODUCING SLIDING CLASP FASTENERS

Filed Feb. 6, 1939

Inventor:
A. Boenecke
by Glascock Downing & Seebold
Attorneys.

Patented Nov. 18, 1941

2,262,881

UNITED STATES PATENT OFFICE 2,262,881

METHOD OF PRODUCING SLIDING CLASP FASTENERS

Alfred Boenecke, Berlin, Germany

Application February 6, 1939, Serial No. 254,965
In Germany February 11, 1938

2 Claims. (Cl. 18—59)

This invention relates to an improved method of producing sliding clasp fasteners.

A sliding clasp fastener of the usual kind comprises two stringers or supports composed of fabric and the fastener elements which are secured separately thereto and may consist of metal or of other materials. In the production of sliding clasp fasteners of this kind it has been proposed to apply the metallic fastener elements in one continuous operation to the two stringers which, so far as the production of the fastener itself is concerned, are available in a condition ready to receive the elements.

It is an object of the invention to improve generally on methods of producing sliding clasp fasteners, and to devise an entirely new method of production, which as compared with the methods hitherto in use is much more simple to perform, so that in consequence the complete fastener can also be produced very cheaply.

In the accomplishment of the object aforesaid the invention accordingly resides in a method of producing sliding clasp fasteners, which consists in producing the fastener elements together with the stringers for both series of elements simultaneously from a preformed strip of flexible material by stamping down spaced portions of the centre of the strip to provide a series of openings so as to leave intermediate transversely disposed webs, separating the strip longitudinally to cut centrally through the webs and the openings so as to form alternate projections and intermediate recesses, and thereupon displacing the separated parts of the strip so that the projections on the one part are disposed opposite to the recesses on the other part.

For the latter operation there can be employed a slider, which moves the two series of elements into engagement with one another, whereupon the fastener strip thus completed can be wound on to a supply drum and can then be severed in any desired length and furnished in each case with a sliding clasp.

The material from which the fastener is produced may be of any kind suitable for the purpose, such as synthetic resin, ebonite, suitably prepared rubber compounds or the like.

The strip of material as employed for the above process is suitably preformed to impart the requisite characteristics to the finished fastener. Thus, for example, the central portion will preferably be thicker than the marginal zones of the strip forming the stringers, while bordering the thicker section down the centre there will preferably be furnished on either side a hollow beading. The openings are then stamped in the thicker central portion and also partly in the beadings, so that the beadings serve to back the fastener elements in the finished fastener.

The invention is more fully described below with reference to the accompanying drawing, in which Fig. 1 is a diagrammatical illustration, partially in section, of the apparatus employed for carrying out the method according to the invention.

Figure 1:
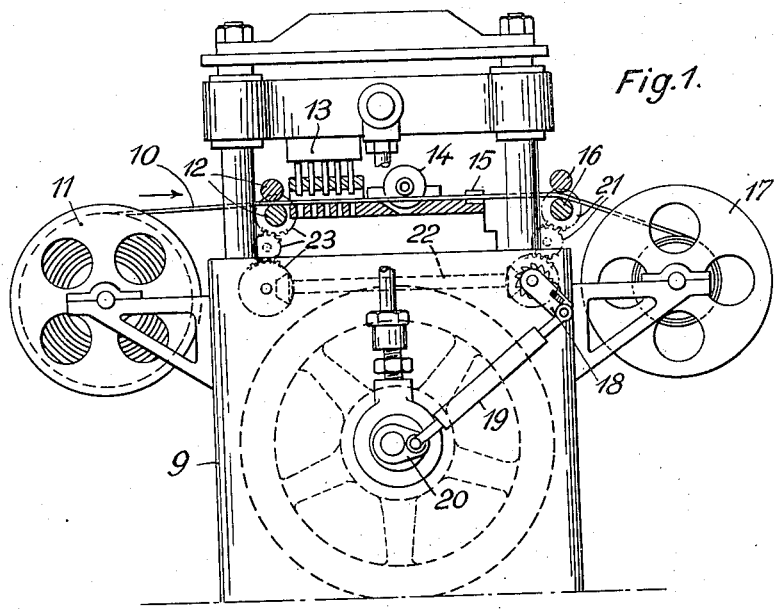

There is employed as a basis for the method of producing the fastener in accordance with the invention a strip of a suitable flexible material, which has been preformed, for example by extrusion, in a manner dependent on the desired appearance of the finished fastener elements. A suitable form for the purpose in question is illustrated in Fig. 2. This strip of preformed material is located on the supply reel 11 (Fig. 1).

The two appertaining parts of the fastener, or the two co-operating series of fastener elements, are produced simultaneously with their stringers. In the drawing the stringers are designated at 1, and beadings 2 are provided having through-going passages 3 so disposed as to leave between them a zone 4 extending along the centre of the strip, this zone preferably being somewhat thicker than the stringers 1 but not so thick as the beadings 2. The preformed strip is initially of double width, being separated subsequently along the groove 5 to form the two appertaining parts of the fastener after the fastener elements have been produced.

Figure 2:
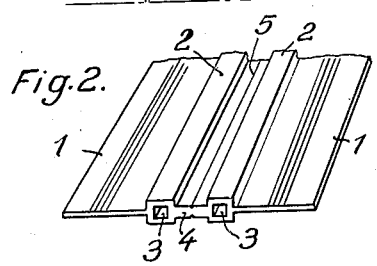
Fig. 2 is a perspective view of a preformed strip of flexible material such as may suitably be employed for carrying out the method.

The preformed strip as in Fig. 2 is designated 10 in Fig. 1, and upon being taken from the reel 11 it is conducted between the rollers 12 to the punch 13 of the apparatus 9. If desired the rollers 12 can be omitted and the apparatus for producing the fastener can be connected up in direct fashion with the means for producing the preformed strip.

Figure 3:
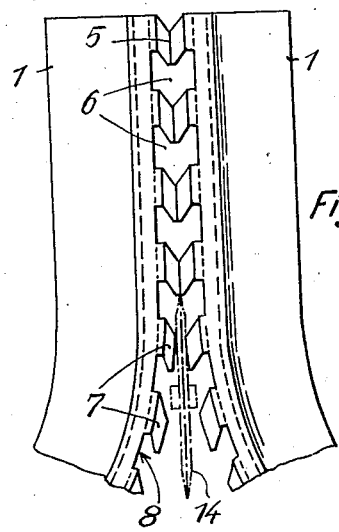
Fig. 3 is a plan view of a piece of preformed strip material in the course of production of the fastener.

In the embodiment illustrated in the drawing it is assumed that by means of the punch 13 five perforations 6 are produced simultaneously in the central zone 4 and also partially in the beadings 2 so as to cut through the throughgoing passages 3 (Fig. 3). Following the application of the perforations 6 the strip 10 is separated down the centre along the groove 5, for example by means of a knife 14. If desired, the longitudinal separation of the strip can also be carried out by one of the elements of the punch 13.

In this way there are produced the primary parts of the finished fastener, namely, the two stringers 1 having the two series of fastener elements 7 with the intermediate recesses 8 extending into the throughgoing passages 3 in the beadings 2, and by means of a sliding clasp of the conventional kind the elements 7 of the one series can be made to engage in the recesses 8 of the other series. To eliminate the possibility of sharp edges on the elements 7 the groove 5 in the zone 4 along which the separation is subsequently performed is suitably rounded off along the edges.

The method of production does not terminate with the longitudinal separation of the strip 10 by the knife 14. Behind the knife 14 there is provided a tool in the form of a fixed clasp 15, which causes the two series of fastener elements to interengage in the manner referred to, as shown in Fig. 4.

It is in the interlocked condition that the completed fastener strip, conducted between the rollers 16, is wound upon the reel 17, from which it can afterwards be withdrawn, ready for use, and severed in any desired length and thereupon furnished with a sliding clasp of the conventional kind.

Figure 4:
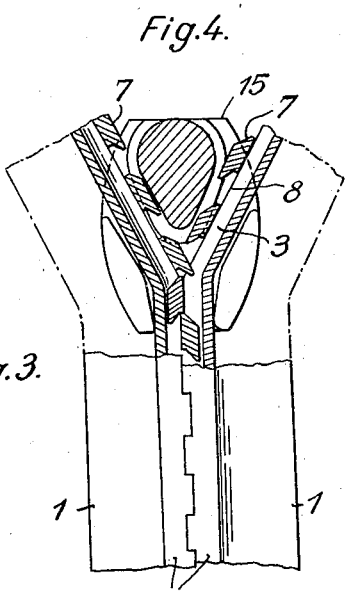
Fig. 4 is a view similar to Fig. 3, partially in section, after completion of the fastener elements.

Fig. 4 shows the fastener after it has been completed and furnished with its own sliding clasp 15, the clasp 15 on the apparatus 9 being a fixed tool which merely serves the purpose of causing the two parts of the fastener to be interengaged before being wound on the reel.

In the apparatus 9 provision must be made for intermittent advance of the strip 10 by means of the pairs of rollers 12 and 16, and in this connection the pairs of rolers 12 and 16 must be made to operate synchronously. These rollers can be driven by gear wheels 21 and 23, between which there is a connecting shaft 22, by means of which the synchronism is obtained. As shown in Fig. 1, the drive for the rollers 12 and 16 is derived from the main shaft of the apparatus 9 by way of the crank 20, the connecting rod 19 and the ratchet gear 18.

It will be understood that no limitation is made to the specific details illustrated in the drawing and described by way of example in the foregoing, and that numerous modifications are quite possible within the scope of the claims without departing from the spirit of the invention.

What I claim as new and desire to secure by Letters Patent is:

1. A method of producing sliding clasp fasteners and stringers therefor from a flexible strip having two stringers and spaced longitudinally extending hollow beads connected by a central strip which comprises, removing spaced portions of the central strip and portions of the hollow beads adjacent the central strip to provide openings spaced along the flexible strip leaving intermediate transverse webs in the central strip, simultaneously shaping said webs to provide one lateral edge of each transverse web with an angular projection and the other lateral edge of each transverse web with an angular recess, cutting the transverse webs longitudinally of the flexible strip to divide the projections and separate the stringers, and displacing one stringer longitudinally of the other stringer so that the transverse webs of one stringer are opposite the recesses of the other stringer, whereby the webs of one stringer may be moved into interlocking engagement between the webs of the other stringer.

2. A method of producing sliding clasp fasteners and stringers integral therewith from a flexible strip having two stringers and spaced longitudinally extending hollow beads connected by a central strip which comprises, stamping spaced portions of the central strip and portions of the hollow beads adjacent the central strip to provide openings spaced along the flexible strip leaving intermediate transverse webs in the central strip and to provide one lateral edge of each transverse web with a projection and the other lateral edge of each transverse web with a recess corresponding in shape to said projection, severing the transverse webs and the projections longitudinally of the flexible strip to separate the stringers, and displacing one stringer with respect to the other stringer so that the transverse webs of one stringer are opposite the recesses of the other stringer, whereby the webs of one stringer may be moved into interlocking engagement between the webs of the other stringer.

ALFRED BOENECKE.